(12) United States Patent
Suggi Liverani et al.

(10) Patent No.: US 9,526,370 B2
(45) Date of Patent: Dec. 27, 2016

(54) FUNNEL ELEMENT FOR MOCHA PROVIDED WITH PERFORATION ARRANGEMENT AND CARTRIDGE THEREFORE

(75) Inventors: Furio Suggi Liverani, Trieste (IT); Luciano Navarini, Trieste (IT); Oriana Savonitti, Buja (IT)

(73) Assignee: Illycaffe' S.p.A. (IT)

( * ) Notice: Subject to any disclaimer, the term of this patent is extended or adjusted under 35 U.S.C. 154(b) by 352 days.

(21) Appl. No.: 12/738,907

(22) PCT Filed: Oct. 21, 2008

(86) PCT No.: PCT/IB2008/002805
§ 371 (c)(1),
(2), (4) Date: Sep. 2, 2010

(87) PCT Pub. No.: WO2009/053811
PCT Pub. Date: Apr. 30, 2009

(65) Prior Publication Data
US 2010/0313766 A1    Dec. 16, 2010

(30) Foreign Application Priority Data
Oct. 22, 2007    (IT) .............................. MO2007A0323

(51) Int. Cl.
*A47J 31/30*    (2006.01)
*A47J 31/06*    (2006.01)
(Continued)

(52) U.S. Cl.
CPC ........... *A47J 31/303* (2013.01); *A47J 31/0673* (2013.01); *B65D 65/466* (2013.01);
(Continued)

(58) Field of Classification Search
CPC . A47J 31/0673; A47J 31/303; B65D 85/8046; B65D 65/466
(Continued)

(56) References Cited

U.S. PATENT DOCUMENTS 3,275,448 A * 9/1966 Sommer ................... A23F 5/40
426/106
3,336,139 A    8/1967 Mech et al.
(Continued)

FOREIGN PATENT DOCUMENTS

| CN | 1509245 A | 6/2004 |
| CN | 1530298 A | 9/2004 |

(Continued)

OTHER PUBLICATIONS

Lange, J., et al, "Recent Innovations in Barrier Technologies for Plastic Packaging—A Review," Packaging Technology and Science, 2003, p. 149-158, 16, John Wiley & Sons, Ltd.
(Continued)

*Primary Examiner* — Jianying Atkisson
(74) *Attorney, Agent, or Firm* — Laubscher, Spendlove & Laubscher, P.C.

(57) ABSTRACT

A container arranged for containing a dosed quantity of a solid product from which a beverage is extractable includes a wall defining a cavity suitable for containing the product, the wall being made of a material that is impermeable to water and oxygen. The container walls contain a cavity suitable for containing the solid product and include a portion having a plurality of holes, the portion being coated by a removable closing element made of a material that is impermeable to water and oxygen.

18 Claims, 5 Drawing Sheets

(51) Int. Cl.
  *B65D 65/46* (2006.01)
  *B65D 85/804* (2006.01)
(52) U.S. Cl.
  CPC .......... *B65D 85/8046* (2013.01); *Y02W 90/11* (2015.05); *Y02W 90/12* (2015.05); *Y02W 90/13* (2015.05)
(58) Field of Classification Search
  USPC ............ 99/289, 290, 295, 330, 451; 426/77; 206/524.1–524.7
  See application file for complete search history.

(56) References Cited

U.S. PATENT DOCUMENTS

| | | | |
|---|---|---|---|
| 3,403,617 A | | 10/1968 | Lampe |
| 3,784,390 A | * | 1/1974 | Hijiya et al. ............. 106/144.72 |
| 3,993,840 A | * | 11/1976 | Tsuji et al. ..................... 428/413 |
| 4,820,533 A | * | 4/1989 | Seaborne et al. ............... 426/76 |
| 5,217,803 A | * | 6/1993 | McBride et al. ............. 428/323 |
| 5,656,311 A | | 8/1997 | Fond |
| 5,776,527 A | | 7/1998 | Blanc |
| 6,025,000 A | | 2/2000 | Fond et al. |
| 6,062,127 A | | 5/2000 | Klosinski et al. |
| 7,172,814 B2 | * | 2/2007 | Hodson ..................... 428/479.6 |
| 7,442,322 B2 | * | 10/2008 | Sapienza et al. ............... 252/70 |
| 2004/0202698 A1 | * | 10/2004 | Ramji et al. ................... 424/443 |
| 2005/0136096 A1 | * | 6/2005 | Davidson ..................... 424/442 |
| 2005/0136155 A1 | | 6/2005 | Jordan et al. |
| 2005/0271846 A1 | * | 12/2005 | Suzuki ........................ 428/36.91 |
| 2006/0073190 A1 | * | 4/2006 | Carroll et al. ................ 424/440 |
| 2006/0174769 A1 | | 8/2006 | Favre et al. |
| 2007/0000390 A1 | | 1/2007 | Albrecht |
| 2007/0122600 A1 | * | 5/2007 | Yoshino et al. .............. 428/220 |
| 2007/0186784 A1 | * | 8/2007 | Liverani et al. ................ 99/295 |
| 2007/0199453 A1 | | 8/2007 | Rasmussen et al. |
| 2008/0041810 A1 | * | 2/2008 | Itoh ..................... B65D 41/045 215/316 |

FOREIGN PATENT DOCUMENTS

| | | | | |
|---|---|---|---|---|
| CN | 1618871 A | 5/2005 | | |
| CN | 1737062 A | 2/2006 | | |
| CN | 1826072 A | 8/2006 | | |
| CN | 101088879 A | 12/2007 | | |
| CN | 101117167 A | 2/2008 | | |
| EP | 0324072 A1 | 7/1989 | | |
| EP | 0850269 B1 | 9/1995 | | |
| EP | 1440903 A1 | 7/2004 | | |
| EP | 1579792 A1 | 9/2005 | | |
| EP | 1579792 B2 | 11/2010 | | |
| FR | 2644679 A1 | 9/1990 | | |
| GB | 803486 | 10/1958 | | |
| GB | 998381 | 7/1965 | | |
| GB | 2436323 A | * | 9/2007 | ........... B65D 65/466 |
| JP | H09502115 A | 3/1997 | | |
| JP | 2000060734 A2 | 2/2000 | | |
| JP | WO 2006016703 A1 | * | 2/2006 | ........... B65D 41/045 |
| RU | 2278063 C2 | 6/2002 | | |
| WO | 8904282 A1 | 5/1989 | | |
| WO | 9747452 A1 | 12/1997 | | |
| WO | 9950346 A1 | 10/1999 | | |
| WO | 0039213 A1 | 7/2000 | | |
| WO | 02058522 A2 | 8/2002 | | |
| WO | 02081337 A1 | 10/2002 | | |
| WO | 02092440 A2 | 11/2002 | | |
| WO | 02098759 A1 | 12/2002 | | |
| WO | 03020803 A2 | 3/2003 | | |
| WO | 03073896 A1 | 9/2003 | | |
| WO | 2004018770 A1 | 3/2004 | | |
| WO | 2004065225 A2 | 8/2004 | | |
| WO | 2005030482 A1 | 4/2005 | | |
| WO | 2006030461 A1 | 3/2006 | | |
| WO | 2006043098 A1 | 4/2006 | | |
| WO | 2006078162 A1 | 7/2006 | | |
| WO | 2007015261 A2 | 2/2007 | | |
| WO | 2007054479 A1 | 5/2007 | | |
| WO | 2007072020 A2 | 6/2007 | | |
| WO | 2007125337 A1 | 11/2007 | | |
| WO | 2008041262 A1 | 4/2008 | | |
| WO | 2008155226 A1 | 12/2008 | | |

OTHER PUBLICATIONS

Corre, Yves-Marie, et al, "Morphology and Functional Properties of Commercial Polyhydroxyalkanoates: A Comprehensive and Comparative Study," Polymer Testing, 2012, p. 226-235, 31, Elsevier Ltd.

Cheng, Mei-Ling, et al, "Physical and Transport Properties of Polyhydroxybutyrate/Clay Nanocomposite Membranes."

* cited by examiner

FUNNEL ELEMENT FOR MOCHA PROVIDED WITH PERFORATION ARRANGEMENT AND CARTRIDGE THEREFORE

This application is a continuation of PCT International Application No. PCT/IB2008/002805 filed Oct. 21, 2008. PCT/IB2008/002805 claims priority to IT Application No. MO2007A000323 filed Oct. 22, 2007. The entire contents of these applications are incorporated herein by reference.

The invention relates to a container for food use, in particular a single-dose container for a ground or powdered solid product, from which a beverage is extractable by heat, such as, for example, mocha coffee, espresso coffee, cappuccino, milk, chocolate, tea, functional drinks, aromatised drinks.

Single-dose containers, known as pods, are known, which are usable both in mocha coffee machines and in machines for espresso coffee. The pods are provided with a soft enclosure in which a preset quantity of ground coffee is contained. The enclosure is substantially shaped in the shape of a biconvex disc and is made of porous material, in particular filter paper. In order to prepare a coffee beverage by means of the pod, using, for example, a mocha coffee maker, the pod is inserted into the filtering funnel of the coffee maker so that the lower face of the pod faces the boiler and the upper face faces the filtering bottom of the collecting tank of the mocha coffee maker. During operation of the mocha coffee maker, the hot water coming from the boiler traverses the lower face of the pod and reaches the ground coffee, extracting the coffee beverage thereof. The extracted beverage exits the upper face of the pod, traverses the filtering bottom of the collecting tank and collects in the latter.

Single-dose containers known as capsules are further known that are provided with a stiff enclosure in which is enclosed a preset quantity of ground coffee, or of another powdered product from which a beverage is extractable by heat. The capsule consists of a hollow intermediate portion, which is substantially cylinder-shaped and is made of stiff material, for example plastics. The opposite ends of the intermediate portion are closed by porous walls, made of filter paper or of a stiff perforated material.

Both capsules that are usable in espresso coffee machines and capsules that are usable in mocha coffee machines are known. In the latter case, the capsules are insertable into the filtering funnel of the mocha coffee maker and are usable in a similar manner to what is disclosed above with reference to the pods. In fact, the hot water coming from the boiler crosses the lower porous or perforated face of the capsule and reaches the ground coffee, extracting the coffee beverage thereof, which, by exiting the upper face of the capsule, traverses the filtering bottom of the collecting tank and collects in the latter.

A drawback of the single-dose containers disclosed above, whether pods or capsules, consists of the fact that the respective porous or perforated walls are not able to act as a barrier to atmospheric oxygen and to ambient humidity.

Consequently, it is necessary to package known pods and capsules in protective enclosures, made of a suitable barrier material, for example synthetic plastics and/or aluminium. Pods and capsules are conserved until the moment of use inside respective protective enclosures so as to prevent humidity and/or ambient air penetrating inside the single-dose containers, and, interacting chemically with the solid product contained therein, alter the organoleptic properties thereof.

This entails a significant increase in production time and costs as for each single-dose container a corresponding protective enclosure must be made and suitable packaging machines must be used to enclose each single-dose container in the corresponding protective enclosure.

Further, for preparing a beverage, for example a coffee-based beverage, using a pod or a capsule of known type, a user is forced to waste a certain quantity of time to extract the single-dose container from the respective enclosure before inserting the pod or capsule into the filtering funnel of the mocha coffee maker.

It should finally be noted that once the beverage has been prepared, the user has to dispose in a suitable manner of or possibly recycle the protective enclosures that, similarly to the used pods and to the used capsules, constitute polluting waste (that is classifiable as solid urban waste).

An object of the invention is to improve known single-dose containers for solid, ground or powdered products, from which are extractable beverages by heat such as, for example, mocha coffee, espresso coffee, cappuccino, milk, chocolate, tea. Another object is to reduce the costs and time for producing single-dose containers for solid, ground or powdered products, from which are extractable beverages by heat.

A further object is to make it easier for users to use single-dose containers for solid, ground or powdered products from which are extractable beverages by heat.

Another further object is to provide a single-dose container for solid, ground or powdered products, from which are extractable beverages by heat that does not require a protective enclosure acting as a barrier agent to atmospheric oxygen and/or ambient humidity.

Still another object is to provide a single-dose container for solid, ground or powdered products, from which by heat are extractable beverages, which, once used, does not constitute a polluting refuse.

In a first aspect of the invention, a container is provided that is arranged for containing a dosed quantity of a solid product, from the solid product a beverage being extractable, the container comprising a wall arrangement defining a cavity suitable for containing the solid product, wherein the wall arrangement is made of a material that is impermeable to water and oxygen.

Owing to this first aspect it is possible to produce a soft or stiff single-dose container for solid, ground or powdered products, from which are extractable beverages by heat, that does not need to remain enclosed in a protective enclosure until the moment of use.

In fact, the material forming the wall arrangement acts effectively as a barrier to humidity and atmospheric oxygen, preventing the latter from penetrating inside the container and altering the organoleptic properties of the product contained therein.

In this manner, the user who wishes to prepare by means of a mocha-type coffee maker or by means of an espresso coffee machine, an heat-extractable beverage, for example a coffee-based beverage, is no longer forced to waste time extracting the capsule or pod from the respective protective enclosure and is not forced to dispose of or recycle the latter suitably as refuse.

In an embodiment, the material that is impermeable to water and oxygen is a food grade material, in particular an edible film, that is soluble in hot water, i.e. at a temperature equal to about 50-60° C. In this manner, the hot water used for extracting the beverage solubilises the enclosure, comes into contact with the dosed quantity of solid product, for example a dose of coffee, and extracts the beverage thereof.

The single-dose container may be soft, i.e. be a pod that is entirely made of the aforesaid material that is soluble in hot water, or stiff material, i.e. a capsule made of stiff material the wall arrangement of which comprises opposite end walls made in the material that is soluble in hot water.

In the case of the pod made of the material that is water-soluble, as the latter is dissolved completely in the extracted beverage, the need to dispose of the used pod as refuse or to recycle the used pod is consequently eliminated. In another embodiment, the material that is impermeable to water and oxygen is a heat-shrinkable material, in particular a food grade heat-shrinkable plastic film, and the single-dose container is a stiff capsule having opposite end walls made of the aforesaid heat-shrinkable film.

In this manner, the hot water used for extracting the beverage lacerates in one or more points the heat-shrinkable film, of an end wall, penetrates the capsule, comes into contact with the dosed quantity of solid product contained therein, for example a dose of coffee, and extracts the beverage thereof. The latter exits the opposite end of the capsule inasmuch as the opposite end wall, made of the same heat-shrinkable film, is similarly lacerated by the high-temperature beverage.

In a second aspect of the invention, there is provided a container arranged for containing a dosed quantity of a solid product, from the solid product a beverage being extractable, comprising a wall arrangement defining a cavity suitable for containing the solid product, the wall arrangement comprising a portion in which is obtained a plurality of holes, wherein the portion is coated by a removable closing element, the removable closing element being made of a material that is impermeable to water and oxygen.

Owing to this second aspect it is possible to produce a stiff single-dose container for solid, ground or powdered products, from which are extractable beverages by heat, that does not need to remain enclosed in a protective enclosure until the moment of use.

In fact, in the aforesaid stiff single-dose container or capsule, the portions of the wall arrangement that are perforated and thus permeable to water and oxygen are maintained constantly protected from the external environment by the removable closing element, for example portions of adhesive film. The latter are removed only at the moment of use, i.e. when the user has to insert the capsule into the filtering funnel of a mocha-type coffee maker, or into an espresso coffee machine.

In a third aspect of the invention, there is provided a filtering funnel element for a mocha-type coffee maker, provided with a perforating arrangement arranged for perforating a wall arrangement of a container that is insertable into the filtering funnel element, the container containing a dosed quantity of a solid product from which a beverage is extractable by the coffee maker.

In a fourth aspect of the invention, there is provided a collecting tank element for a mocha-type coffee maker, provided with a perforating arrangement arranged for perforating a wall arrangement of a container, the container being insertable into a filtering funnel element in the coffee maker and containing a dosed quantity of a solid product from which a beverage is extractable by the coffee maker.

Owing to the third aspect and to the fourth aspect of the invention it is possible to produce a stiff single-dose container (capsule), for solid, ground or powdered products, from which are extractable beverages by heat, which is made entirely of a barrier material of known type, such as, for example, plastics, aluminium, a composite (multilayered) material of known type or another suitable material.

In fact, the perforating arrangement made in the filtering funnel element and in the collecting tank element, both of which are incorporable into a mocha-type coffee maker, lacerate the enclosure of the capsules, respectively, when the latter is inserted into the filtering funnel and when the collecting tank is tightened or locked by pressure or fitted by a bayonet coupling (according to the type of coffee maker) on the boiler of the coffee maker. In this manner, in the capsules the openings are produced that are necessary for enabling, in use, the extracting water coming from the boiler to enter the capsules and for enabling the coffee beverage extracted therefrom to exit the capsule.

In a fifth aspect of the invention, there is provided a container arranged for containing a dosed quantity of a solid product, from the solid product a beverage being extractable, including a wall arrangement defining a cavity suitable for containing the solid product, wherein it is provided with a perforating arrangement arranged for perforating preset portions of the wall arrangement so as to enable an extracting fluid to penetrate the cavity and/or to enable the beverage to exit the cavity.

Owing to this aspect, it is possible to produce a stiff single-dose container (capsule), for solid, ground or powdered products, from which are extractable beverages by heat, that is entirely made of a barrier material of known type, such as for example plastics, aluminium or a suitable composite material.

The capsule provided with a perforating arrangement can be used both in a mocha coffee maker and in an espresso coffee machine. The perforating arrangement includes a pair of perforating members mounted on the opposite end walls of the capsule so as to be suitably spaced away from the latter. Each perforating member is provided with punch elements facing the adjacent wall of the capsule. When the capsule is inserted, for example into the filtering funnel of a mocha coffee maker, and the latter is closed by tightening together the collecting tank and the boiler (or by pressure locking or by a bayonet coupling, according to the type of coffee maker), both the perforating members are pressed in the direction of the adjacent walls, so that the latter are perforated by the perforating elements.

In this manner, in the capsule the openings are produced that are necessary to enable the extracting water to enter the capsule and to enable the extracted beverage to exit the capsule.

The invention will be better understood and implemented with reference to the attached drawings that show an embodiment thereof by way of non-limiting example, in which.

Figure 1:
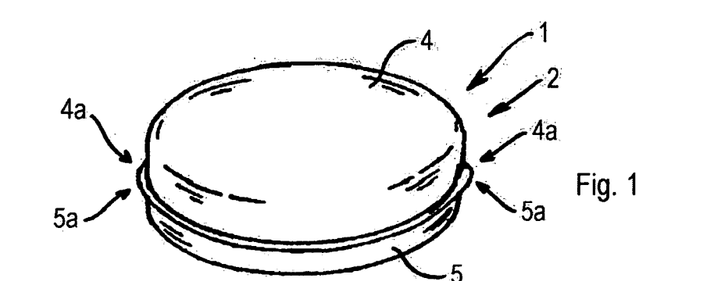
FIG. 1 is a perspective view showing a single-dose container made entirely of a material that is soluble in hot water.
Figure 2:
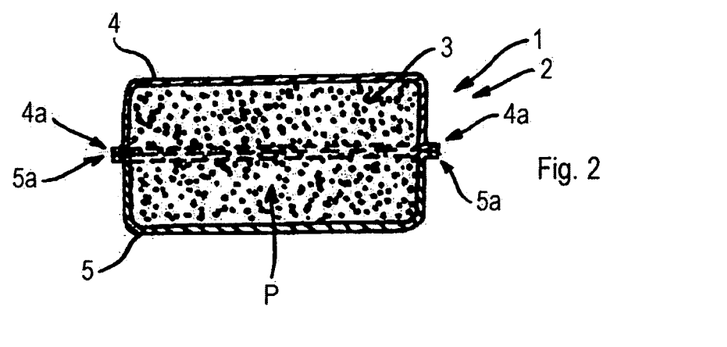
FIG. 2 is a schematic cross section of the single-dose container in FIG. 1.

FIGS. 1 and 2 show a single-dose container 1 for mocha coffee maker. The container 1 comprises a soft body 2 that has the approximate shape of a hollow cylinder and comprises a pair of mutually opposite walls 4, 5. Each wall 4, 5 is shaped substantially as a semicylinder and comprises a peripheral portion 4a, 5a. The two walls 4, 5 are mutually welded near respective peripheral portions 4a, 5a, so that the concavities of the walls 4, 5 are mutually facing and define a cavity 3. The latter is filled with a predosed quantity of ground or powdered product P.

The product P may comprise, for example, ground mocha-type coffee, ground espresso coffee, powdered cappuccino, powdered chocolate, powdered milk, powdered tea.

Each wall 4, 5 is made of an edible film that is soluble in hot water, in particular water-soluble at a temperature equal to about 50-60° C.

In an embodiment, the edible film is polyvinyl alcohol (PVOH)-based. The PVOH is a compound obtained by polymerisation of the vinyl acetate and subsequent controlled hydrolysis of the acetate units. By controlling the hydrolysis of the polymer in a suitable manner and according to known methods, it is possible to obtain innumerable types of PVOH having different physical-chemical properties. It is thus possible to obtain a PVOH that is water-soluble at the aforesaid temperature of approximately 50-60° C. Further, the results of numerous studies of food toxicity have illustrated the possibility of using PVOH as an edible coating agent.

In another embodiment, the edible film is polysaccharide-based, the polysaccharides may comprise: cellulose polysaccharides, starches, algal or vegetable polysaccharides, animal polysaccharides, microbial or fungal polysaccharides.

Table 1 below shows examples of the aforesaid polysaccharides:

TABLE 1

| Cellulose polysaccharides | Methylcellulose |
| | Hydroxypropylmethylcellulose |
| | Hydroxypropylcellulose |
| | Carboxymethylcellulose |
| Starches | Amylose |
| | Hydroxypropylated starch |
| | Dextrins (starch-hydrolysed) |
| Algal polysaccharides | Alginates |
| | Carrageenans |
| Vegetable polysaccharides | Pectins |
| Animal polysaccharides | Chitin |
| | Chitosan |
| Microbial/fungal polysaccharides | Pullulan |
| | Levan |

The presence in the edible film of thickening substances such as, for example, carrageenans, alginates and/or pectins, enables functional beverages to be produced. In fact, when a beverage is extracted from the product P by heat solubilising the edible film of the single-dose container 1, the aforesaid thickening substances are dispersed in the beverage and act as texturising agents, i.e. by increasing the consistency (so-called "texture") of the beverage when the latter is taken orally by the consumer.

In another embodiment, the edible film is protein-based, the proteins may comprise: collagen, gelatine, zein (maize reserve protein), gluten, soy protein isolates, serum protein isolates, casein, rice proteins concentrate.

In a further embodiment, the edible film comprises a mixture of polysaccharides and proteins, such as, for example, pullulan and rice proteins concentrate.

In another further embodiment, the edible film comprises a mixture of edible plasticising proteins and compounds, such as, for example, casein and beeswax.

In a still further embodiment, the edible film comprises aromatising substances and/or vegetable extracts, comprising, for example: vanilla, ginger, cinnamon, nutmeg, *ginseng*. This enables a predefined taste to be given to the beverage that is extractable from the single-dose container 1.

Owing to the use of the aforesaid edible film, the product P is enclosed in an enclosure, at ambient temperature and until the moment of use (and more exactly until the moment of contact with the hot water produced in the boiler of the mocha coffee maker), acts effectively as a barrier humidity and atmospheric oxygen and makes the use of further protective enclosures unnecessary.

In use, the single-dose container 1 can be easily inserted into the filtering funnel of a mocha coffee maker of known type (not shown), and positioned there so that one of the two walls faces the boiler and the other wall faces, when the coffee maker is assembled, the filtering bottom of the collecting tank.

During operation of the coffee maker, the hot water produced in the boiler and rising into the filtering funnel solubilises the wall of the body 2 facing the boiler (for example, the wall 4). The hot water thus reaches the product P, i.e. the coffee powder, and extracts the coffee beverage thereof, which solubilises the wall of the body 2 facing the filtering bottom of the collecting tank (for example, the wall 5), traverses the filtering bottom and collects in the collecting tank.

Figure 3:
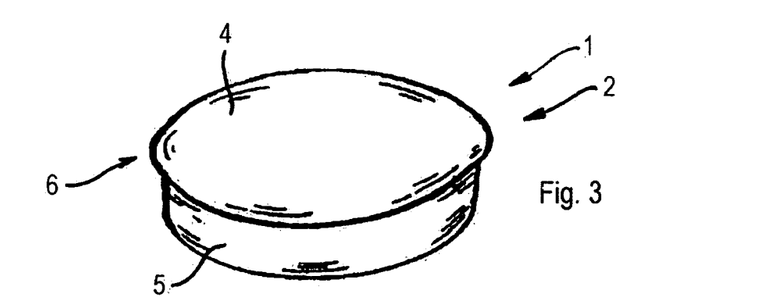
FIG. 3 is a perspective view showing an embodiment of the single-dose container in FIG. 1.
Figure 4:
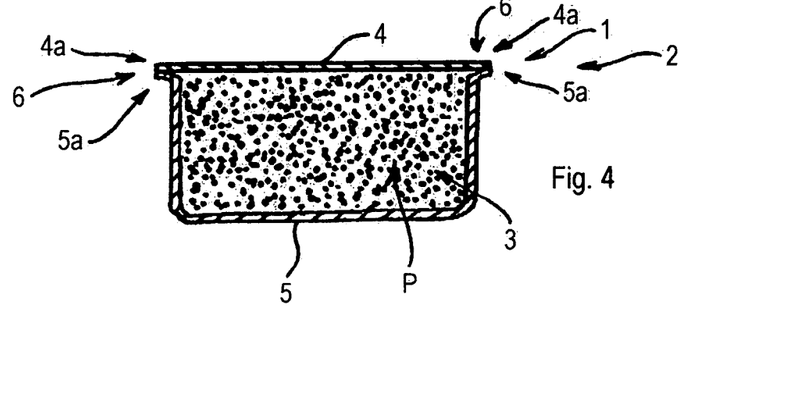
FIG. 4 is a schematic cross section of the embodiment in FIG. 3.

FIGS. 3 and 4 show an embodiment of the single-dose container 1 in which the soft body 2 is made of the same edible film previously disclosed with reference to FIGS. 1 and 2 and comprises the pair of mutually opposite walls 4, 5, bounding the cavity 3 in which is located the predosed quantity of product P, for example ground mocha coffee. Nevertheless, in the embodiment shown in FIGS. 3 and 4, whilst the wall 5 of the body 2 has a semicylindrical shape, the wall 4 is substantially flat and circular. The wall 4 closes the cavity 3 in a similar manner to the lid of a saucepan and has a diameter that is greater than the diameter of the cavity 3. The peripheral portions 4a and 5a of the walls 4 and 5, which are welded together, define a circular flange 6. The latter is restable, in use, on a corresponding free edge of the filtering funnel of a mocha coffee maker of known type, thus enabling the single-dose container 1 to be positioned in a more stable manner in the filtering funnel. In use, the single-dose container 1 disclosed with reference to FIGS. 3 and 4 is placed in the filtering funnel of a mocha coffee maker of known type so that the semicylindrical wall 5 faces the boiler and the flat wall 4 faces, with the coffee maker assembled, the filtering bottom of the collecting tank. During operation of the coffee maker, the hot water produced in the tank and rising in the filtering funnel solubilises the semicylindrical wall 5, reaches the product P, i.e. the coffee powder, and extracts the coffee beverage thereof. The latter in turn solubilises the flat wall 4, traverses the filtering bottom of the collecting tank and collects in the collecting tank of the coffee maker.

Figure 19:
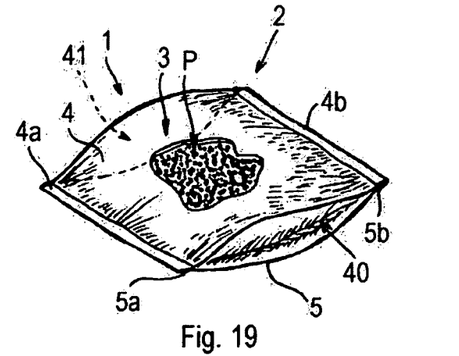
FIG. 19 is a schematic partially sectioned view, showing a further embodiment of the single-dose container in FIG. 1.

FIG. 19 shows a further embodiment of the single-dose container 1, in which the soft body 2 is made in the shape of a bag by the same edible film disclosed previously with reference to FIGS. 1 to 4. The body 2 comprises a pair of mutually opposite walls 4, 5 and a pair of further walls 40, 41, that are mutually opposite and arranged transversely to the walls 4 and 5. Each wall 4, 5 is shaped substantially as a quadrilateral and comprises a pair of opposite edge portions, indicated in FIG. 19 respectively with the numbers 4a, 4b and 5a, 5b. The two walls 4, 5 are welded together near the edge portions 4a, 4b and 5a, 5b and are further welded along further edge portions (which are not shown) with the further walls 40, 41. In this manner, the walls 4, 5 and the further walls 40, 41 overall define the cavity 3 in which the predosed quantity of product P, for example ground mocha coffee, is placed.

Similarly to the single-dose containers 1 shown in FIGS. 1 to 4, also the single-dose container 1 in FIG. 19 can be inserted into the filtering funnel of a mocha coffee maker of known type (not shown), and be positioned there so that one of the walls faces the boiler and the other wall faces, with the coffee maker assembled, the filtering bottom of the collecting tank. In order to make the single-dose container 1 easily housable inside the mocha coffee maker, during manufacture of the body 2 the dimensions of the latter are selected so as not to be excessive compared with the dimensions of the cavity comprised in the filtering funnel. When the mocha coffee maker is in operation, the hot water produced in the tank and rising in the filtering funnel solubilises the wall of the body 2 facing the boiler (for example, the wall 4). The hot water thus reaches the product P (coffee powder), extracting the coffee beverage thereof. The latter solubilises the wall of the body 2 facing the filtering bottom of the collecting tank (for example, the wall 5), traverses the filtering bottom and collects in the collecting tank.

Figure 5:
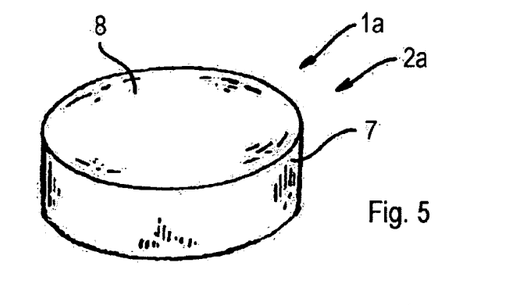
FIG. 5 is a perspective view showing a single-dose container provided with opposite end walls made of a material that is soluble in hot water.
Figure 6:
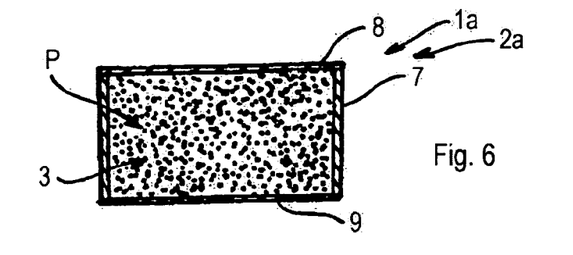
FIG. 6 is a schematic cross section of the single-dose container in FIG. 5.

FIGS. 5 and 6 show a single-dose container 1a provided with a body 2a that is partially made of stiff material. The body 2a comprises a cylindrical side wall 7 and a pair of mutually opposite end walls 8, 9. The end walls 8 and 9, both flat and circular, have a diameter equal to the diameter of the side wall 7 and are fixed peripherally to the latter. The end walls 8 and 9, together with the side wall 7, bound the cavity 3 containing a predosed quantity of product P, for example ground mocha coffee. The side wall 7 is stiff and is made of plastics for food, aluminium for food or another suitable material, whilst the end walls 8 and 9 are made of the same edible film that is soluble in hot water disclosed above. The plastics that are usable for food comprise, for example, polypropylene (PP) and/or high-density polyethylene (HDPE). The side wall 7, if it is made of plastics, can be obtained by known moulding methods, such as, for example: injection moulding, compression moulding, thermoforming, hybrid moulding-forming technologies (i.e., implying the use of both thermoforming and compression moulding). If the side wall 7 is made of aluminium, it can be obtained by known moulding and/or drawing methods.

In Table 2, set out below, various examples are listed of suitable materials used to manufacture the single-dose container 1a:

TABLE 2

| Type of material | Example |
|---|---|
| Thermoplastic materials | Polyethylene terephthalate (PET) |
| Elastomeric-thermoplastic materials (TPEs) | SANTOPRENE ®, mixture of non cross-linked ethylene propylene diene monomer (EPDM) and polypropylene (PP) |
| Thermosetting compositions | Polyesters |
| Rubbers/elastomers | Silicone; methyl vinyl silicone (MVQ) |
| Polylaminated thermoplastic materials | Composite film (multilayered) made of polyethylene (PE)/ polyethylene terephthalate (PET)/ polyvinylidene chloride(PVDC) |
| Other polylaminated materials | Composite film (multilayered) made of polyethylene (PE)/ polyethylene terephthalate (PET)/ aluminium |

Further, the side wall 7 can be made using biodegradable polymers (BPs) of known type. This enables a single-dose container 1a to be produced that is eco-compatible inasmuch as, once it has been used, the single-dose container 1a can easily be recycled by known composting procedures. The known biodegradable polymers include, for example, MATER-BI® (made from maize starch), polylactic acid or PLA (lactic acid polymer), polyhydroxyalkanoates and microbial polyesters. By means of these biodegradable polymers it is possible to produce materials that can be injection moulded or thermoformed.

The single-dose container 1a illustrated in FIGS. 5 and 6 is inserted into the filtering funnel of a mocha coffee maker of known type and positioned there so that one of the two end walls 8, 9 faces the boiler and the other wall faces, when the coffee maker is assembled, the filtering bottom of the collecting tank. Unlike the single-dose containers 1 illustrated in FIGS. 1 to 4, in the single-dose container 1a only the end walls 8, 9 of the body 2a are solubilised during operation of the coffee maker. Apart from that, the operation of the single-dose container 1a is similar to that disclosed above for single-dose containers 1 provided with a soft body 2.

The single-dose container 1a can be shaped and sized in a desired manner, and, in particular, can be shapingly coupled with the filtering funnel comprised in the mocha coffee maker of known type. This enables a single-dose container to be made that is easily insertable inside the filtering funnel and is therefore significantly effective during use.

In an embodiment that is not shown, the end walls 8, 9 of the single-dose container 1a are made of a food grade heat-shrinkable plastic film. A plastic film of the aforesaid type is known, for example, from US2007/0122600, disclosing a film that is heat-shrinkable at low temperature (approximately 60° C.) and comprises a mixture of ethylene-α-olefin copolymers and ethylene copolymers.

In another embodiment that is not shown, one of the end walls 8, 9 of the single-dose container 1a is made of heat-shrinkable plastic film, whilst the other is made of edible film soluble in hot water.

If the single-dose container 1a having end walls 8, 9 made of heat-shrinkable plastic film is used in a mocha coffee maker of known type, the hot water and the coffee beverage thereof produced during operation of the coffee maker do not dissolve the end walls 8, 9, but lacerate the latter at one or two points, thus forming openings. More exactly, in the end wall facing the boiler (for example, the wall 8), the openings produced by the hot water rising along the filtering funnel enable the latter to penetrate the cavity 3, reach the product P and extract the coffee beverage thereof. The coffee beverage thereof, in turn, produces similar further openings in the end wall facing the filtering bottom of the collecting tank (for example, the wall 9). Through these further openings, the coffee beverage extracted therefrom reaches the filtering bottom of the collecting tank and, through the latter, the collecting tank of the coffee maker.

The aforesaid heat-shrinkable film, like the edible film, acts effectively as a barrier to ambient humidity and atmospheric oxygen, thus making the use of protective enclosures for the single-dose container 1a superfluous.

In another embodiment of the single-dose container 1a that is not shown, one of the two end walls 8, 9 is made from the edible film and the other end wall is made from the heat-shrinkable film.

Figure 7:
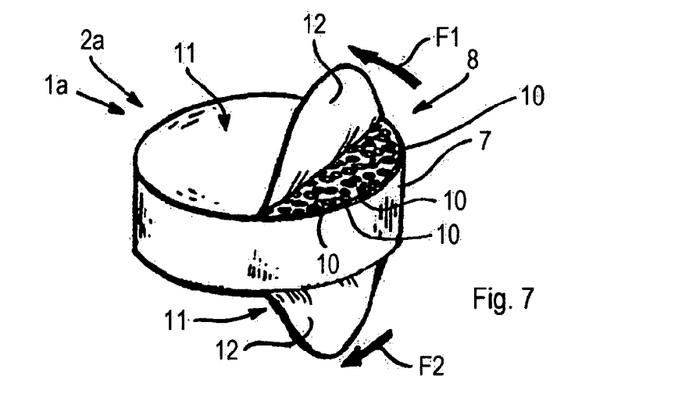
FIG. 7 is a perspective view showing a single-dose container including opposite end walls that are stiff, perforated and coated by a removable closing element.
Figure 8:
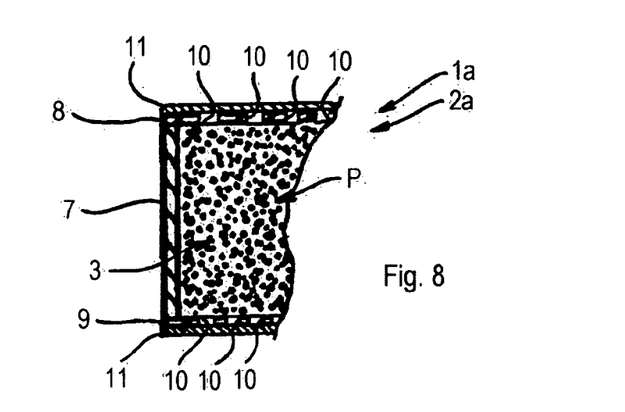
FIG. 8 is a fragmentary and incomplete schematic cross section of the container in FIG. 7.

FIGS. 7 and 8 show a further embodiment of the single-dose container 1a, in which also the end walls 8, 9 are made of the same stiff material forming the side wall 7, i.e. plastics, aluminium, biodegradable polymers or other suitable materials, for example one or more of the materials previously listed in Table 2. In each of the end walls 8, 9 a plurality of holes 10 is obtained, and each of the end walls 8, 9 is covered by a peelable film 11 made of a material that is substantially impermeable to oxygen and humidity. The end walls 8, 9 are flat and circular, have a diameter that is the same as the diameter of the side wall 7 and are fixed peripherally to the side wall 7. The end walls 8, 9 bound with the side wall 7 the cavity 3 containing a predosed quantity of product P, for example ground mocha coffee. The peelable film 11 adheres to the corresponding end wall 8, 9 owing to an adhesive face 12 with which it is provided.

During transport and/or storage, the end walls 8, 9 are maintained protected from the peelable film 11, which is removed only at the moment of use, i.e. before the single-dose container 1a is inserted into the filtering funnel of a mocha coffee maker of known type. Consequently, also this embodiment of the single-dose container 1a provided with perforated end walls 8, 9 makes the use of protective enclosures unnecessary.

In order to remove the peelable film 11 it is sufficient to grasp a peripheral portion thereof and pull the peelable film 11 according to the directions indicated by the arrows F1 and F2 (FIG. 7). Once the peelable film 11 has been removed from both end walls 8, 9, the single-dose container 1a is inserted into the filtering funnel and positioned there so that one of the two end walls 8, 9 faces the boiler and the other wall faces, when the coffee maker is assembled, the filtering bottom of the collecting tank.

During operation of the coffee maker, the hot water produced in the tank and rising in the filtering funnel traverses the holes 10 of the end wall facing the boiler (for example, the wall 8), penetrates the cavity 3 and reaches the product P, i.e. the ground mocha coffee, extracting the coffee beverage thereof. The latter in turn exits the cavity 3 through the holes 10 of the end wall facing the filtering bottom of the collecting tank (for example, the wall 9), traverses the filtering bottom and collects in the collecting tank of the coffee maker.

In an embodiment that is not shown, in the single-dose container 1a one of the end walls 8, 9 is stiff and provided with holes 10, whilst the opposite end wall is made of edible film soluble in hot water.

In another embodiment that is not shown, in the single-dose container 1a one of the end walls 8, 9 is stiff and provided with holes 10, whilst the opposite end wall is made of heat-shrinkable film.

Figure 9:
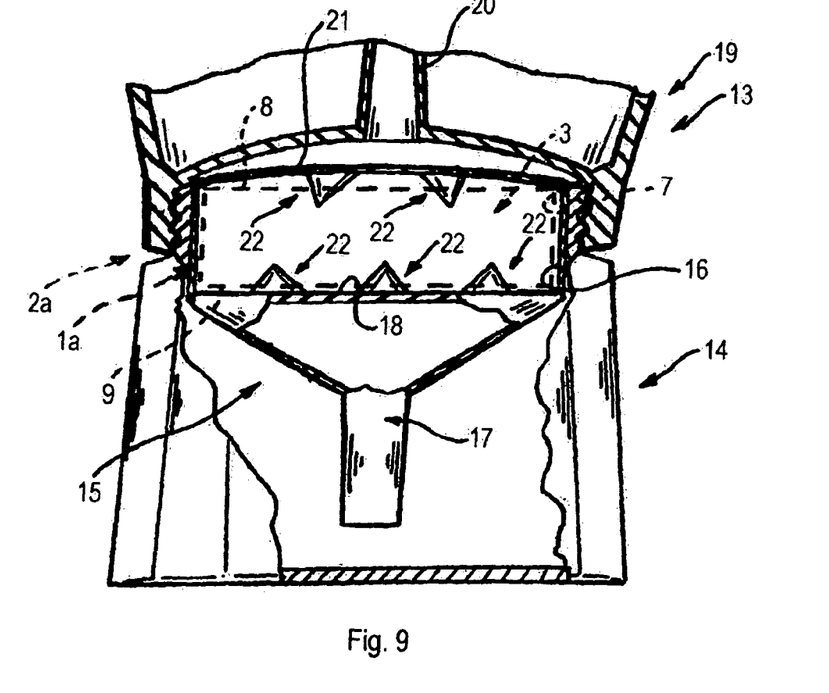
FIG. 9 is a partially sectioned fragmentary and incomplete frontal view of a mocha-type coffee maker in which the filtering bottom of the collecting tank and the bottom of the filtering funnel are provided with a perforating arrangement.

FIG. 9 shows a further other embodiment of the single-dose container 1a (shown by a dashed line) that is provided with a cylindrical body 2a in which both the side wall 7 and the opposite end walls 8, 9 are made of a material that is able to act as a barrier to humidity and to atmospheric oxygen, i.e. plastics, aluminium, biodegradable polymers, composite (multilayered) material, or other suitable materials, for example one or more of the materials previously listed in Table 2.

The body 2a comprises the side wall 7 and the end walls 8, 9, that overall define the cavity 3 containing a predosed quantity of product (which is not shown), for example ground mocha coffee. Also this embodiment of the single-dose container 1a, inasmuch as it is not made entirely from a barrier material, does not need protective enclosures.

The single-dose container 1a shown in FIG. 9 is usable with, a mocha-type coffee maker 13 that is structurally and functionally similar to mocha coffee makers of known type but differs from the latter by the fact that it is provided with a plurality of perforating elements 22.

The coffee maker 13 comprises a collecting tank element 19 and a boiler element 14, arranged for being screwed to one another so as to be hermetically closed, and a filtering funnel 15 that is insertable vertically inside the boiler element 14.

The collecting tank element 9 is provided with a filtering bottom 21, which is slightly concave in the direction of the boiler element 14 and is provided with a plurality of orifices (not shown), and a conveying conduit 20 by means of which the coffee beverage extracted therefrom can be conveyed inside the collecting tank element 19. The filtering funnel 15 comprises a containing portion 16 and a conduit portion 17, between which there is interposed a bored and circular filtering face 18. The containing portion 16 has a hollow cylindrical shape and is suitable for receiving the single-dose container 1a.

Figure 10:
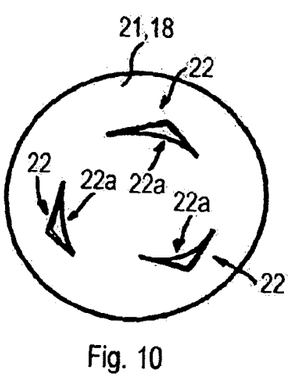
FIG. 10 is a schematic plan view of the filtering bottom of the collecting tank and/or of the bottom of the filtering funnel in FIG. 9, showing the perforating arrangement.

Both the filtering face 18 of the filtering funnel 15 and the filtering bottom 21 of the collecting tank element 19 are provided with perforating elements 22. As shown in FIG. 10, each perforating element 22 is shaped approximately as a triangular blade and has a base portion 22*a* that is fixed to the filtering face 18, or to the filtering bottom 21. When the coffee maker 13 is assembled (FIG. 9), the perforating elements 22 comprised in the filtering face 18 protrude in the direction of the filtering bottom 21, whilst the perforating elements 22 comprised in the filtering bottom 21 face the direction of the filtering face 18.

In use, the single-dose container 1*a* is inserted into the containing portion 16 of the filtering funnel 15 and positioned there so that one of the end walls 8, 9 is in contact with the filtering face 18. Consequently, the perforating elements 22 protruding from the filtering face 18 perforate the adjacent end wall (for example, the wall 8) of the single-dose container 1*a*. When the coffee maker 13 is then assembled by screwing together the collecting tank element 13 and the boiler element 14, the perforating elements 22 protruding from the filtering bottom 21 of the tank element 19 perforate and lacerate the adjacent other end wall (for example, the wall 9) of the single-dose container 1*a*.

In this manner, in the single-dose container 1*a* as many openings are produced as there are perforating elements 22 comprised in the coffee maker 13. By means of these openings, during operation of the coffee maker 13, the hot water produced in the boiler element 14 and rising along the conduit portion 17 of the filtering funnel 15 can penetrate the cavity 3 and extract the coffee beverage thereof. The coffee beverage thereof can exit the cavity 3, traverse the filtering bottom 21 of the tank element 19 and discharge into the tank element 19 via the conveying conduit 20.

The perforating elements 22 are also usable in a mocha coffee maker (not shown) in which the collecting tank element 19 and the boiler element 14 are assemblable together by means of a bayonet coupling.

Figure 11:
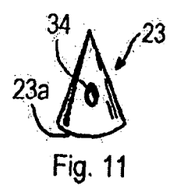
FIG. 11 is a schematic perspective view showing an embodiment of the perforating arrangement.
Figure 12:
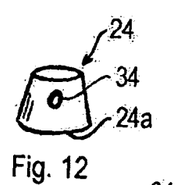
FIG. 12 is a schematic perspective view showing another embodiment of the perforating arrangement.
Figure 13:
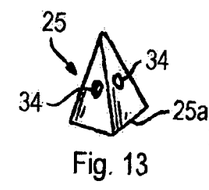
FIG. 13 is a schematic perspective view showing a further embodiment of the perforating arrangement.
Figure 14:
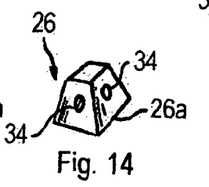
FIG. 14 is a schematic perspective view showing another further embodiment of the perforating arrangements.
Figure 15:
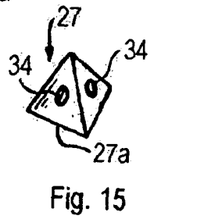
FIG. 15 is a schematic perspective view showing a still further embodiment of the perforating arrangement.

FIG. 11 shows an embodiment of the perforating elements, indicated by the number 23, with which the collecting tank element 19 and/or the filtering funnel 15 can be equipped. This embodiment is particularly efficient if the collecting tank element 19 and/or the filtering funnel 15 are incorporated in a mocha coffee maker (not shown) that is closable by pressure. In this type of mocha coffee maker, the boiler element 14 and the collecting tank element 19 are assembled together without screwing, i.e. without performing rotating movements. Consequently, the perforating elements 23 are cone-shaped so as to be able to act effectively even in the absence of the aforesaid rotating movements. Similarly to the perforating elements 22, also the perforating elements 23 comprise a base portion 23*a*. By means of the latter, the perforating elements 23 are fixed to the filtering face 18 and/or to the filtering bottom 21 so that, when the mocha coffee maker is assembled, the perforating elements 23 comprised in the filtering face 18 protrude in the direction of the filtering bottom 21, whilst the perforating elements 23 comprised in the filtering bottom 21 face the direction of the filtering face 18.

FIGS. 12 to 15 show further embodiments indicated by numbers 24 to 27, in which the perforating elements, respectively, have the shape of a truncated cone, pyramid, truncated pyramid, tetrahedron. Similarly to the perforating elements 22 and 23, also the perforating elements 24, 25, 26 and 27 are fixed to the filtering face 18 and/or to the filtering bottom 21 by respective base portions 24*a*, 25*a*, 26*a*, 27*a*.

Compared with the base portions 22*a*, which are blade-shaped, the base portions 23*a*, 24*a*, 25*a*, 26*a*, 27*a* are substantially more voluminous and thus take the place of a certain number of holes in the filtering face 18 and/or in the filtering bottom 21. Consequently, in the presence of the perforating elements 23, 24, 25, 26, 27, the number of holes are reduced that are available in the filtering face 18 and/or in the filtering bottom 21 and are usable for the passage of the extracting fluid and/or of the extracted beverage. In order to enable the extracting fluid and/or the extracted beverage to flow suitably even in the presence of the perforating elements 23, 24, 25, 26 and 27, transit channels 36 and branched transit channels 37 are made in the thickness of the latter. The transit channels 36 and the branched transit channels 37 are shown in detail in FIGS. 20 to 23, which exemplify the structure of the aforesaid channels in a (pyramid-shaped) perforating element 25 and in a (truncated-pyramid-shaped) perforating element 26.

Figure 20:
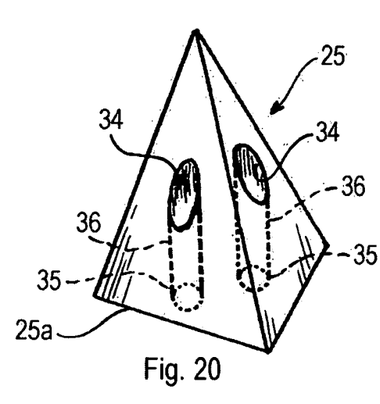
FIG. 20 is an enlarged perspective view of the perforating arrangement in FIG. 13.

FIG. 20 shows the perforating element 25, in the thickness of which there is obtained a plurality of substantially cylindrical transit channels 36, (for reasons of clarity, in FIG. 20 there are shown only two transit channels 36). Each transit channel 36 runs along the perforating element 25 parallel to a longitudinal axis of the latter (which is not shown) and comprises a pair of mutually opposite end holes 34, 35. The end holes 34, 35 open respectively near one of the side faces of the perforating element 25 and near the base portion 25*a*. In this manner, when the perforating element 25 is fixed on the filtering bottom 21, the extracted beverage, exiting the single-dose container 1*a*, penetrates each transit channel 36 through the end hole 35 and exits the transit channel 36 via the end hole 34, thus reaching the conveying conduit 20. On the other hand, when the perforating element 25 is fixed to the filtering face 18 of the filtering funnel 15, the transit channel 36 is traversed by the extracting fluid, coming from the tank element 14 and directed towards the single-dose container 1*a*.

Figure 21:
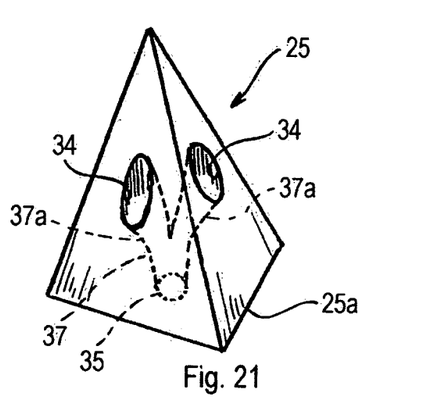
FIG. 21 is an enlarged perspective view, showing an embodiment of the perforating arrangement in FIG. 13.
Figure 22:
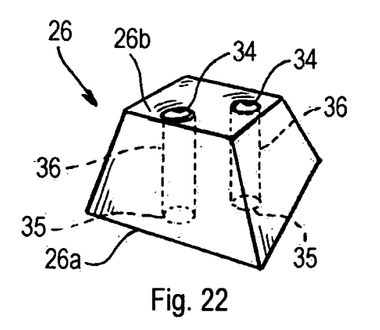
FIG. 22 is an enlarged perspective view of the perforating arrangement in FIG. 14.

FIG. 22 shows an embodiment of the perforating element 25 provided with a branched transit channel 37, that opens near the base portion 25*a* through the end hole 35 and, in the thickness of the perforating element 25, is divided, forming a plurality of diverging branches 37*a* (for reasons of clarity, in FIG. 21 there are shown only two branches 37*a*). The latter emerge at corresponding side faces of the perforating element 25 via respective end holes 34. The extracted beverage and/or the extracting fluid can transit through the branched transit channel 37*a* in a similar manner to that disclosed with reference to FIG. 20.

FIG. 22 shows a perforating element 26, in which the end holes 34, 35 of the transit channels 36 (of which only two are shown for reasons of clarity) open near the base portion 26*a* and near a face 26*b* opposite the base portion 26*a*.

Figure 23:
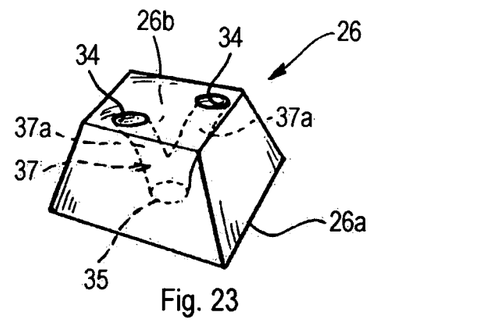
FIG. 23 is an enlarged perspective view, showing an embodiment of the perforating arrangement in FIG. 14.

FIG. 23 shows an embodiment of the perforating element 26 provided with the branched transit channel 37, that divides, forming a plurality of diverging branches 37*a* (of which only two are shown, for reasons of clarity). The branches 37*a* emerge via respective end holes 34 near the face 26*b*. The extracted beverage and/or the extracting fluid can transit in the transit channels 36 and/or in the branched transit channels 37 of the perforating element 26 in a similar manner to what has been disclosed with reference to FIGS. 20 and 21.

Owing to the transit channels 36 and to the branched transit channels 37, it is possible to obtain an optimal flow of liquids (extracted beverage and/or extracting fluid) through the filtering face 18 and/or the filtering bottom 21 even when the latter are provided with more bulky perforating elements i.e. the perforating elements 23, 24, 25, 26, 27.

In embodiments that are not shown the perforating elements 23, 24, 25, 26, 27 are provided with both transit channels 36 and branched transit channels 37.

In other versions that are not shown, the perforating elements 23, 24, 25, 26, 27 are not provided with transit channels 36, or with branched transit channels 37.

The perforating elements 22, 23, 24, 25, 26, 27 can be distributed on the filtering face 18 of the filtering funnel 15 and/or on the filtering bottom 21 of the tank element 19 so as to be mutually staggered. FIG. 10 shows, by way of example, an arrangement in which three perforating elements are mutually staggered according to angles of approximately 120°.

In embodiments that are not shown the perforating elements 22, 23, 24, 25, 26, 27 are provided in a number lesser or greater than three and are mutually staggered according to variable angles.

In an embodiment that is not shown, one of the end walls 8, 9 of the single-dose container 1a illustrated in FIG. 9 is made of edible film that is soluble in hot water.

In another embodiment that is not shown, one of the end walls 8, 9 of the single-dose container 1a illustrated in FIG. 9 is made of heat-shrinkable film.

In a further embodiment that is not shown, one of the end walls 8, 9 of the single-dose container 1a illustrated in FIG. 9 is perforated and coated by a removable adhesive film made of material that is impermeable to humidity and oxygen.

Owing to the aforesaid embodiments that are not shown, it is possible to use a mocha-type coffee maker in which only the tank portion or only the filtering funnel are provided with perforating elements 22, 23, 24, 25, 26, 27. In fact, whilst the end wall of the body 2a that is made of barrier material is lacerated, in use, by the perforating elements 22, 23, 24, 25, 26, 27, the opposite end wall is, according to the embodiment, dissolved, lacerated by heat-shrinkage or is freely traversed by liquids (hot water; extracted beverage) inasmuch as it is perforated.

The collecting tank element 19 and the filtering funnel 15, which are usable both together and individually, enable the use of mocha coffee makers of known type to be improved significantly inasmuch as it enables a domestic user to exploit single-dose containers 1a (FIG. 9) made completely of a barrier material (plastics, aluminium, biodegradable polymers, or any other similar material, for example one of the materials previously listed in Table 2).

These single-dose containers 1a do not require individual protective enclosures and do not need to be stored in protective containers that may be substantially bulky. Consequently, the user can store up to the moment of use the single-dose containers 1a even in a space of reduced dimensions such as, for example, a drawer of a piece of furniture, without fearing the harmful effects of humidity and/or oxygen on the product enclosed on the single-dose containers 1a.

Further, as the collecting tank element 19 and the filtering funnel 15 are easily incorporable in mocha coffee machines of known type, it is sufficient, for example, to replace the conventional filtering funnel (i.e. devoid of perforating elements) of a mocha coffee maker with the filtering funnel 15 to improve in a substantially simple and non-expensive way domestic procedures for preparing coffee-based beverages or other hot beverages (for example, chocolate).

Figure 16:
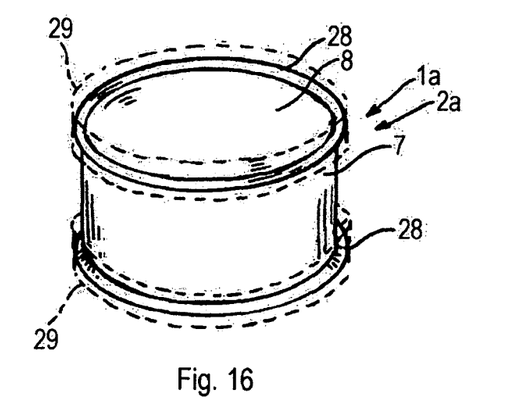
FIG. 16 is a schematic perspective view of a single-dose container provided with a perforating arrangement.
Figure 17:
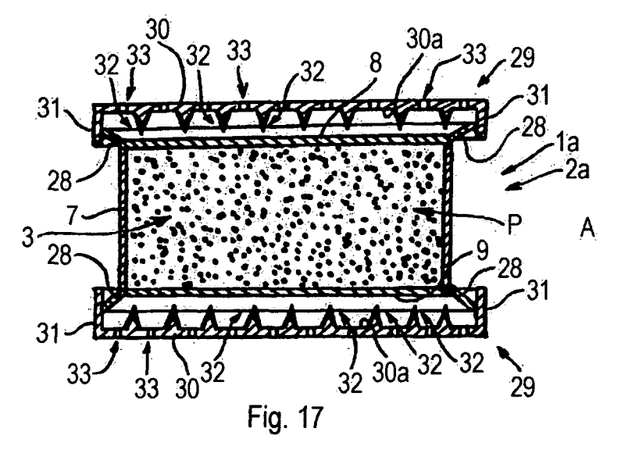
FIG. 17 is a schematic cross section of the single-dose container in FIG. 16.
Figure 18:
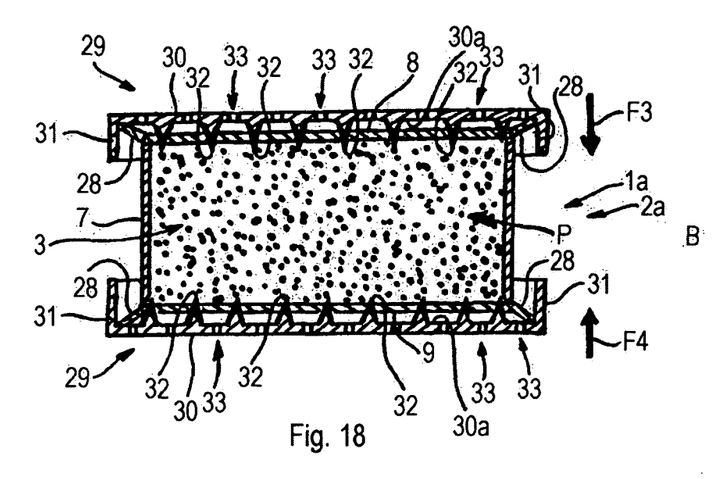
FIG. 18 is a section similar to that in FIG. 17, showing the operation of the perforating arrangement.

FIGS. 16 to 18 show a still further embodiment of the single-dose container 1a, in which the side wall 7 and the opposite end walls 8, 9 of the body 2a are made of a material that is able to act as a barrier to humidity and to atmospheric oxygen, i.e. plastics, aluminium, biodegradable polymers, composite (multilayered) material, or other suitable materials, for example one or more of the materials previously listed in Table 2.

Near each of the opposite end walls 8, 9, the side wall 7 extends to form an anchoring edge 28, arranged obliquely to the body 2a. Each anchoring edge 28 enables a perforating member 29 (shown with a dashed line in FIG. 16 for reasons of clarity) to be inserted under pressure near the corresponding end wall 8, 9.

In an embodiment that is not shown, the anchoring edge 28 is incomplete, i.e. it is made only at preset portions of the body 2a of the container 1a.

Each perforating member 29 comprises a plate portion 30 and an edge portion 31. The plate portion 30 is disc-shaped and, when the perforating member 29 is inserted into the container 1a, is arranged parallel to the respective end wall 8, 9. In an operating face 30a of the plate portion 30 facing the body 2a when the perforating member 29 is inserted on the container 1a, there is comprised a plurality of perforating elements 32 having a substantially conical shape. The plate portion 30 is further provided with a plurality of through holes 33, interposed between the perforating elements 32.

In an embodiment that is not shown, the perforating elements 32 are arranged in a mutually staggered manner. In other embodiments that are not shown, the perforating elements can be pyramid-shaped, truncated-pyramid-shaped, tetrahedron-shaped, blade-shaped.

The edge portion 31 leads away from a peripheral zone of the plate portion 30, in a manner that is substantially orthogonal to the latter and extends in a direction that is opposite the latter.

When the perforating member 29 is inserted onto the corresponding end wall 8, 9 of the body 2a, the edge portion 31 engages a peripheral zone of the anchoring edge 28. When each perforating member 29 is inserted, the operating face 30a, and thus the perforating elements 32 comprised therein, are suitably spaced away from the corresponding end wall 8, 9, owing to the shape and dimensions of the edge portion 31 and of the anchoring edge 28. The perforating members 29 are thus in a rest configuration A (FIG. 17).

The single-dose container 1a provided with the perforating members 29 is usable, for example, in a mocha coffee maker of known type. The container 1a, in which the perforating members 29 are in the rest configuration A is positioned inside the filtering funnel comprised in the boiler, so that one of the two end faces 8, 9 faces the boiler and the other faces the filtering bottom of the collecting tank. When the collecting tank is screwed, or locked under pressure or fitted by a bayonet coupling to the boiler (according to the type of coffee maker), on the plate portions 30 of the perforating members 29 sufficient mechanical pressure is exerted to move the perforating members 29 to the adjacent end walls 8, 9, according to two reciprocally opposite directions, indicated by the arrows F3 and F4 (FIG. 18). Consequently, the edge portions 31 slide along the corresponding anchoring edges 28 according to the opposite directions F3, F4, the operating faces 30a approach the corresponding end walls 8, 9 and the perforating elements 32 reach and perforate the opposite end walls 8, 9. The perforating members 29 thus move from the rest configuration A to an operating configuration B (FIG. 18).

During operation of the coffee maker, the extracting hot water traverses the through holes 32 of the plate portion 30 and the plurality of openings produced in the end wall of the container 1a facing the boiler (for example, the wall 8), thus entering the cavity 3 of the container 1a and extracting the beverage, for example ground coffee, from the solid product P.

Owing to the further openings produced by the perforating elements 32 in the end wall facing the collecting tank (for example, the wall 9), the coffee beverage extracted therefrom exits the container 1a, traverses the through holes 32 of the plate portion 30 and penetrates the collecting tank through the filtering bottom of the latter.

In an embodiment that is not shown, the perforating member 29 is divided into a plurality of distinct elements, each of which comprises a plate portion and an edge portion, is provided with perforating elements 32 and is able to engage the anchoring edge 28 of the container 1a.

In another embodiment that is not shown, the plate portion 30 of the perforating member 29 is devoid of through holes 33. In this embodiment, the passage of the liquids (extracting water; extracted beverage) occurs via a gap that is formed between the plate portion 30 and the adjacent end wall 8, 9. In a further embodiment that is not shown, the single-dose container 1a is provided with a single perforating member 29, inasmuch as one of the end walls 8, 9 is made of an edible film that is soluble in hot water.

In another further embodiment that is not shown, the single-dose container 1a is provided with a single perforating member 29, inasmuch as one of the end walls 8, 9 is made of a heat-shrinkable film.

In a still further embodiment that is not shown the single-dose container 1a is provided with a single perforating member 29, inasmuch as one of the end walls 8, 9 is perforated and coated by a removable adhesive film made of material that is impermeable to humidity and oxygen.

Owing to the aforesaid embodiments that are not shown, it is possible to use a single perforating member 29. In fact, whilst one of the end walls 8, 9 of the body 2a is perforated by the perforating elements 32, the opposite end wall is, according to the embodiment, dissolved, lacerated by heat-shrinkage or freely traversed by liquids (hot water; extracted beverage) inasmuch as it is perforated.

The invention claimed is:

1. A single dose container containing a dosed quantity of ground coffee from which a beverage is extractable, said container being configured for use in a coffee machine, said beverage being extractable by said coffee machine, said container comprising a top end wall, a bottom end wall, and a side wall defining a cavity containing said ground coffee, said side wall being made of a stiff material that is impermeable to humidity and oxygen to define a stiff portion of said container, said top end wall and said bottom end wall being made of an edible film that is water-soluble at a temperature of between 50-60° C.

2. The container according to claim 1, wherein said edible film comprises polyvinyl alcohol.

3. The container according to claim 1, wherein said edible film comprises a polysaccharide.

4. A container according to claim 3, wherein said polysaccharide is selected from a group consisting of starches, cellulose polysaccharides, algal polysaccharides, vegetable polysaccharides, animal polysaccharides, and microbial and/or fungal polysaccharides.

5. The container according to claim 4, wherein said starches are selected from a group consisting of amylose, hydroxypropylated starch and dextrins.

6. The container according to claim 4, wherein said cellulose polysaccharides are selected from a group consisting of methyl cellulose, hydroxypropylcellulose, hydroxypropylmethylcellulose and carboxypropylcellulose.

7. The container according to claim 4, wherein said algal polysaccharides are selected from a group consisting of alginates and carrageenans.

8. The container according to claim 4, wherein said vegetable polysaccharides comprise pectins.

9. The container according to claim 4, wherein said animal polysaccharides are selected from a group consisting of chitin and chitosan.

10. The container according to claim 4, wherein said microbial and/or fungal polysaccharides are selected from a group consisting of pullulan and levan.

11. The container according to claim 1, wherein said edible film comprises a protein.

12. The container according to claim 11, wherein said protein is selected from a group consisting of collagen, zein, gluten, soy protein isolates, serum protein isolates, casein and rice protein concentrate.

13. The container according to claim 1, wherein said edible film further comprises an edible plasticising compound.

14. The container according to claim 1, wherein said edible film comprises aromatising substances or vegetable extracts.

15. The container according to claim 14, wherein said aromatising substances or said vegetable extracts are selected from a group consisting of vanilla, ginger, cinnamon, nutmeg and *ginseng*.

16. The container according to claim 1, wherein said side wall is made of biodegradable material.

17. The container according to claim 16, wherein said biodegradable material is selected from a group consisting of: polylactic acid (PLA), polyhydroxyalkanoates, and microbial polyesters.

18. A single dose container as defined in claim 1, where said side wall is made of one of plastics and aluminium.

* * * * *